United States Patent
Brown et al.

(10) Patent No.: US 11,739,863 B2
(45) Date of Patent: Aug. 29, 2023

(54) BUNDLE SECTION OF A PIPE BUNDLE FOR SUBSEA INSTALLATION

(71) Applicant: Subsea 7 Limited, Sutton (GB)

(72) Inventors: Philip Derek Brown, Dyce (GB); Robert Dicken, Stonehaven (GB)

(73) Assignee: Subsea 7 Limited, Sutton (GB)

( * ) Notice: Subject to any disclaimer, the term of this patent is extended or adjusted under 35 U.S.C. 154(b) by 883 days.

(21) Appl. No.: 16/467,966

(22) PCT Filed: Dec. 12, 2017

(86) PCT No.: PCT/GB2017/053710
§ 371 (c)(1),
(2) Date: Jun. 8, 2019

(87) PCT Pub. No.: WO2018/109450
PCT Pub. Date: Jun. 21, 2018

(65) Prior Publication Data
US 2020/0088324 A1    Mar. 19, 2020

(30) Foreign Application Priority Data

Dec. 13, 2016  (GB) ...................................... 1621188

(51) Int. Cl.
*F16L 9/18*    (2006.01)
*F16L 9/19*    (2006.01)
(Continued)

(52) U.S. Cl.
CPC .................. *F16L 9/19* (2013.01); *F16L 1/16* (2013.01); *F16L 3/22* (2013.01); *G01M 3/2853* (2013.01); *F16L 9/20* (2013.01)

(58) Field of Classification Search
CPC ....... F16L 9/19; F16L 1/16; F16L 3/22; F16L 9/20
(Continued)

(56) References Cited

U.S. PATENT DOCUMENTS 349,472 A * 9/1886 Anderson ................. F16L 9/01
                                                    138/155
1,927,105 A * 9/1933 Welch ..................... F16L 55/04
                                                    138/28
(Continued)

FOREIGN PATENT DOCUMENTS

EP   1 950 547    7/2008
FR   2 529 289    12/1983
(Continued)

OTHER PUBLICATIONS

API Specification 17J, "Specification for Unbonded Flexible Pipe," American Petroleum Institute, Jan. 2009.
(Continued)

*Primary Examiner* — James F Hook
(74) *Attorney, Agent, or Firm* — Levy & Grandinetti (57) ABSTRACT

A bundle section of a subsea pipeline bundle has a rigid carrier pipe having an end closed by a transverse bulkhead and one or more fluid conduits in fluid communication with an opening that penetrates the bulkhead. Fluid coupling formations such as a spigot or a recess on an outer face of the bulkhead surround the opening. Leak-tight coupling between successive fluid conduits is effected when the bulkheads of two such bundle sections are brought together. This forces together opposed complementary fluid coupling formations of the bulkheads. The bulkheads connect the adjoining bundle sections fluidly and mechanically.

39 Claims, 6 Drawing Sheets

(51) Int. Cl.
*F16L 1/16* (2006.01)
*F16L 3/22* (2006.01)
*G01M 3/28* (2006.01)

(58) Field of Classification Search
USPC .................. 138/111, 112, 109, 108, 155
See application file for complete search history.

(56) References Cited

U.S. PATENT DOCUMENTS

| | | | | |
|---|---|---|---|---|
| 3,163,448 | A * | 12/1964 | Franklin | G02B 6/4459 138/112 |
| 3,419,291 | A * | 12/1968 | Tomb | F16L 49/04 285/236 |
| 3,590,855 | A * | 7/1971 | Woollen | B67D 1/0867 222/146.1 |
| 4,284,142 | A * | 8/1981 | Kirkland | E21B 33/047 166/344 |
| 4,363,566 | A | 12/1982 | Morton | |
| 4,579,372 | A * | 4/1986 | Morrill | F16L 37/002 285/920 |
| 4,648,747 | A | 3/1987 | Watkins et al. | |
| 4,759,573 | A * | 7/1988 | Delamare | B67D 9/00 285/121.6 |
| 5,839,765 | A | 11/1998 | Carter et al. | |
| 6,513,551 | B2 * | 2/2003 | Louis | F16L 9/18 138/108 |
| 2010/0038899 | A1 * | 2/2010 | Clover | F16L 1/26 285/120.1 |
| 2013/0285369 | A1 * | 10/2013 | Gjerstad | F16L 23/167 285/119 |
| 2020/0011468 | A1 * | 1/2020 | Dicken | F16L 1/26 |

FOREIGN PATENT DOCUMENTS

| | | |
|---|---|---|
| GB | 2 063 410 | 6/1981 |
| GB | 2 267 945 | 12/1983 |
| GB | 2 448 916 | 11/2008 |
| GB | 2522763 | 8/2015 |
| GB | 2527848 | 1/2016 |
| WO | WO 2010/055335 | 5/2010 |
| WO | WO 2012/038799 | 3/2012 |

OTHER PUBLICATIONS

API Recommended Practice 17B, "Recommended Practice for Flexible Pipe," American Petroleum Institute, 5th ed. May 2014.
API Specification 5L, "Specification for Line Pipe," American Petroleum Institute, Dec. 2012.
API Recommended Practice 1111, "Design, Construction, Operation, and Maintenance of Offshore Hydrocarbon Pipelines," American Petroleum Institute, Sep. 2015.

* cited by examiner

BUNDLE SECTION OF A PIPE BUNDLE FOR SUBSEA INSTALLATION

This invention relates to assembling lengthy pipeline bundles by connecting together shorter sections or portions of such bundles end-to-end.

Pipeline bundles are used commonly in the subsea oil and gas industry to provide robust and easily-installed subsea flowline systems. For example, pipeline bundles may be installed in oil fields to connect or 'tie back' production subsea wells, manifolds or well head platforms to host facilities or to subsea tie-in points.

A common pipeline bundle configuration comprises at least one rigid flowline pipe to carry production fluids that comprise oil and/or gas, enclosed within a continuous rigid carrier pipe. The flowline pipe and the carrier pipe are typically of steel but either or both could, in principle, be of composite material. Additional layers or components can be added to the pipes, such as an internal liner or an outer coating. Such additional layers or components can comprise polymer, metal or composite materials. Also, flowline pipes can be single-walled or of double-walled pipe-in-pipe (PiP) construction.

Other elongate elements such as pipes and cables are typically included in a pipeline bundle, extending in parallel with the flowline(s) to carry other fluids, power and data signals along the bundle. The bundle typically terminates in towhead structures at its ends. The towheads may include valves, connectors and manifolds to connect to a wellhead or to subsea jumper pipes.

Integrating a pipeline bundle and towheads to form a towable unit allows a bundle system to be prefabricated, assembled and tested onshore or in sheltered water before it is towed to a subsea field for installation. Conveniently, therefore, multiple elongate elements can be towed together to an installation site as a single integral unit and installed on the seabed simultaneously in one operation. Reducing the number of subsea-connected interfaces simplifies the installation process and improves the reliability of the system, as compared with connecting units at a subsea location and performing tests there instead.

The carrier pipe protects the flowline(s) and any parallel elongate elements both mechanically and against corrosion, and may also contribute significantly to thermal insulation. By surrounding a sealed hollow chamber within, the carrier pipe also contributes buoyancy that enables the bundle to be towed to an installation site.

Longitudinally-distributed transverse spacers hold the flowline(s) and other elongate elements within the carrier pipe and relative to each other. The spacers also facilitate insertion of the flowline(s) and other elongate elements into the carrier pipe during fabrication of the bundle.

Whilst pipeline bundles are generally straight when manufactured, those skilled in the art well understand that rigid pipes of metal—as defined in API (American Petroleum Institute) Specification 5L and Recommended Practice 1111—can bend elastically along their length and so have some flexibility. However, whilst they have flexibility, rigid pipes are to be distinguished from flexible pipes as defined in API Specification 17J and API Recommended Practice 17B.

The composite structure of a flexible pipe, comprising layers of metallic and polymer materials, allows a large bending deflection without a significant increase in bending stress. This results in a much smaller minimum bending radius (MBR) than a rigid pipe—typically about 3 to 6 metres versus about 100 to 300 metres. However, the layers that make up a flexible pipe will be damaged irreversibly if the MBR is exceeded.

Flexible pipes are not rigid enough to contain, or to provide effective mechanical support to, one or more rigid pipes within. Also, large-diameter flexible pipes cannot withstand high hydrostatic pressure. Flexible pipes are therefore unsuitable for use as a carrier pipe of a pipeline bundle.

Rigid pipes of polymer composite material are not yet defined in standards tailored to the subsea oil and gas industry. Like rigid steel pipes, polymer composite pipes are essentially stiff yet elastically flexible. They can withstand more bending strain than rigid steel pipes but cannot flex in a similar way to flexible pipes. Thus, 'rigid pipe' should be understood in this specification as also encompassing rigid pipes of polymer composite material, having bending characteristics much more akin to rigid steel pipe than to flexible pipe—as those terms are understood by those skilled in the art of subsea oil and gas technology.

A typical pipeline bundle is a few kilometres in length, for example approximately 2 km long. Their length is constrained by the availability of land at onshore fabrication facilities such as spoolbases. In principle, therefore, the maximum continuous length of a pipeline bundle is about 7 km. However, most pipeline bundles are considerably shorter. There is a need for longer bundles; in particular, the distance between subsea connection points to be connected by a subsea 'tie back' can exceed the length of available fabrication facilities.

One approach for longer pipelines is to fall back upon traditional pipeline installation methods such as reel-lay. However, such methods cannot install several elongate elements at a time and so cannot match the convenience of installing pipeline bundles. Such methods also forego the protection of a carrier pipe against mechanical damage, corrosion and heat transfer.

In view of these drawbacks, various techniques have been used or proposed to allow the use of longer pipeline bundles. In general, these techniques involve the assembly of two or more shorter bundle sections end-to-end to form a bundle that is as long as the aggregate length of the bundle sections. They therefore present the challenge of how to connect together adjoining bundle sections, both mechanically and for fluid communication between them.

A first conventional technique, used in fabricating a structure such as that disclosed in WO 2010/055335, involves welding together successive pipeline bundle sections inside a dry chamber situated just offshore from an onshore fabrication facility. Welding can also be done onshore, for example on a beach beside such a fabrication facility. In either case, a first, downstream bundle section is partially immersed in the sea or floats on the sea while being joined to a second, upstream bundle section that remains accommodated wholly or partially in the fabrication facility.

A typical sequence to make intermediate connections of the carrier pipe in parallel to the rest of the assembly sequence comprises:
  welding or otherwise connecting together flowlines and other elongate elements of the bundle; and then
  closing the carrier pipe by welding together half-shells or sleeves around the flowlines and other elongate elements.

A major drawback of the abovementioned technique is the difficulty of testing the welds. The critical role of the carrier pipe means that it has to be leak-tight and also mechanically resistant to installation constraints, notably fatigue. Consequently, intensive inspection of the welds is mandated by standards. This ensures redundancy by using multiple inspection methods in succession, such as ultrasound, radiography and magnetic particle inspection (MPI) using penetrant dye. Such repetitive weld inspections are expensive; they also slow down the fabrication process because they lie on the critical path.

GB 2267945 teaches that successive bundle sections may be connected together on a vessel floating offshore. This is complex and expensive because it requires the presence of the vessel, and sufficient hoisting equipment and deck space on the vessel to perform tie-in operations and testing.

Another known technique involves using two or more conventional bundles connected end-to-end as sections of a longer bundle. Typically, the bundle sections have to be installed separately, with individual towing and lowering operations, and are subsequently connected together on the seabed via tie-in spool or jumper pipes. For this purpose, each bundle section may be equipped with towheads arranged to simplify subsea connection of spool or jumper pipes between successive bundle sections. However, this technique requires multiple offshore operations and the creation of multiple critical interfaces deep underwater. Also, the cost of equipping multiple bundle sections with respective pairs of towheads may be prohibitively high.

FR 2529289 discloses a method and device to connect together sets of parallel tubes simultaneously. Two tightening collars or plates are aligned on a central axis, arranged around the tubes and bolted together. This connects male and female tapered ends of the tubes. There is no provision for, or possibility of, additionally connecting together sections of a surrounding carrier pipe that would provide mechanical resistance and external leak tightness.

GB 2063410 discloses a coupling or multiple connector for multiple flexible hoses contained within a flexible outer sheath. This is used for small-diameter flexible hoses and lines, less than 2" (approximately 50 mm) diameter. As the hoses are flexible and of small diameter, the process for manufacturing the coupling system is incomparably different to, and simpler than, the process for manufacturing a rigid pipeline bundle. In a rigid pipeline bundle, a flowline typically has an outer diameter of over 8" (approximately 200 mm) and the carrier pipe is much larger, typically between 24" and 60" (approximately 600 mm to 1500 mm) in diameter.

Also, a coupling like that disclosed in GB 2063410 is not apt to be used for connecting together rigid pipeline bundle sections in a subsea environment, deep underwater. The flexible outer sheath provides little mechanical protection for the hoses within and no effective resistance to hydrostatic pressure or leakage into the space within the sheath. Whilst the hoses are sealed to the end bulkhead, the interface between the end bulkhead and the outer sheath provides a leak path into the sheath.

GB 2522763 describes a method for use in J-lay or S-lay pipe-laying operations, in which pipe sections are prepared onshore before being transported to a site at sea where they are fixed to a portion of already installed pipeline.

GB 2527848 relates to a towable pipeline bundle that includes a buoyancy pipe for providing positive buoyancy to the bundle when in use in seawater.

GB 2448916 describes a system for transporting low temperature fluids that includes an inner flow pipe located in, and thermally isolated from, an outer carrier pipe.

Against this background, the invention provides a bundle section of a pipeline bundle for subsea installation. The bundle section comprises: a rigid elongate carrier pipe having at least one end closed by a transverse bulkhead; and two or more elongate elements extending along and within the carrier pipe to the bulkhead, those elements comprising at least one fluid conduit in fluid communication with a respective opening that penetrates the bulkhead. An outer face of the bulkhead has outwardly-facing fluid coupling formations surrounding the or each opening, those formations being arranged to effect leak-tight coupling when forced longitudinally against opposed complementary fluid coupling formations. Preferably, the fluid coupling formations are fixed relative to the bulkhead.

The fluid coupling formations may comprise at least one male formation projecting from the outer face of the bulkhead. For example, a male formation may comprise a hollow spigot protruding from the outer face, which spigot suitably tapers outwardly from the outer face.

The fluid coupling formations may comprise at least one female formation recessed into the outer face of the bulkhead. Such a female formation is preferably a recess that is wider than the opening surrounded by the recess, and that may taper inwardly from the outer face. The recess is apt to contain an annular seal. There may be a sealing shoulder surface within the recess around the opening.

The outer face of the bulkhead is advantageously machined across substantially its full diameter. This preferably defines a substantially planar or slightly convex seating surface between and around the fluid coupling formations.

The fluid coupling formations are preferably integral with the bulkhead and may be machined from the bulkhead. However it would instead be possible for the fluid coupling formations to be attached to the bulkhead.

The or each fluid conduit is suitably welded to an inner face of the bulkhead around the respective opening for leak-tight fluid communication with that opening. Similarly, the carrier pipe is suitably welded to an inner face of the bulkhead around the elongate elements within the carrier pipe.

Advantageously, the bulkhead further comprises at least one mechanical coupling formation for applying longitudinal force to the bulkhead. Such a mechanical coupling formation suitably projects radially from the bulkhead beyond an outer diameter of the carrier pipe. For example, the mechanical coupling formation may be a flange extending around the bulkhead. In another approach, the mechanical coupling formation comprises male or female arrays of longitudinally-spaced teeth, such as are used in pinbox connectors.

The carrier pipe preferably comprises a minor end portion joined to the bulkhead and a major body portion joined to the end portion by one or more intermediate pieces. In that case, the end portion may have a thicker wall than the body portion. Similarly, the or each fluid conduit may comprise a minor end portion joined to the bulkhead and a major body portion joined to the end portion directly or via one or more intermediate pieces. The minor end portion of the fluid conduit is then preferably longer than the minor end portion of the carrier pipe.

The inventive concept extends to a combination of at least two bundle sections of the invention connected end-to-end with their bulkheads in mutually-opposed, face-to-face relation. The fluid coupling formations of one of those bulkheads are thereby coupled with opposed complementary fluid coupling formations of the other of those bulkheads.

The inventive concept also embraces a pipeline bundle comprising two or more bundle sections connected end-to-end. The bundle sections each comprise: a rigid elongate carrier pipe having at least one end closed by a transverse bulkhead; and two or more elongate elements extending along and within the carrier pipe to the bulkhead, those elements comprising at least one fluid conduit in fluid communication with a respective opening that penetrates the bulkhead. The bulkheads of adjoining bundle sections are in mutually-opposed, face-to-face relation and an outer face of each of those bulkheads has outwardly-facing fluid coupling formations surrounding the or each opening, the fluid coupling formations of one of those bulkheads being coupled with opposed complementary fluid coupling formations of the other of those bulkheads.

Advantageously, there is abutting contact between seating surfaces on the outer faces of the bulkheads between and around the fluid coupling formations. Preferably, the bulkheads are pressed together.

A mechanical locking mechanism preferably acts on the bulkheads. The locking mechanism may comprise one or more tensile elements such as bolts acting in tension between the bulkheads. The locking mechanism suitably applies convergent longitudinal pressure to the bulkheads.

Conveniently, at least one of the bulkheads may include a pressure-testing port communicating with a sealed cavity that surrounds the fluid coupling formations of the bulkheads.

A protective shroud may enclose the bulkheads. Such a shroud preferably comprises first and second abutting parts, each surrounding a respective one of the bulkheads.

The inventive concept also extends to a corresponding method of assembling a subsea pipeline bundle from bundle sections. Each bundle section comprises a rigid elongate carrier pipe containing two or more elongate elements, at least one of which is a fluid conduit, extending along and within the carrier pipe to a bulkhead fixed to an end of the carrier pipe. The method comprises: bringing the bulkheads of the bundle sections into mutually-opposed, face-to-face relation; and applying force longitudinally to effect leak-tight coupling between mutually-opposed complementary fluid coupling formations on the bulkheads, those formations surrounding respective openings in the bulkheads that communicate with the respective fluid conduits.

Conveniently, longitudinal force may be applied to the coupling formations via the bulkheads. Preferably, the bulkheads are brought into mutually-abutting contact between and around the fluid coupling formations.

The bulkheads are advantageously interlocked to locate the bulkheads against lateral or angular movement relative to each other. For example, male and female fluid coupling formations may be engaged by relative longitudinal movement between the bulkheads. The bulkheads are then preferably locked together against separation. Leak-testing may then be performed by applying fluid pressure within a sealed cavity surrounding the fluid coupling formations of the bulkheads.

Thus, in accordance with the invention, a bundle section of a subsea pipeline bundle comprises a rigid carrier pipe having an end closed by a transverse bulkhead, and one or more fluid conduits in fluid communication with an opening that penetrates the bulkhead. Fluid coupling formations such as a spigot or a recess on an outer face of the bulkhead surround the opening.

Leak-tight coupling between successive fluid conduits is effected when the bulkheads of two such bundle sections are brought together. This forces together opposed complementary fluid coupling formations of the bulkheads. The bulkheads connect the adjoining bundles sections fluidly and mechanically.

In summary, therefore, the invention uses end bulkheads to connect bundle sections when assembling a bundle assembly made from those bundle sections. The bulkheads simultaneously connect the carrier pipes of the bundle sections and the pipelines or other elongate elements within the carrier pipes of the bundle sections.

In view of welding sequences and additional weld inspection requirements, one bulkhead is welded to each bundle section on a non-critical manufacturing path, using known methods. The two bulkheads are specifically designed to mate while effecting fluid connection of the pipeline parts of the bundle sections and mechanical connection and tensioning of the carrier pipe parts of the bundle sections. The requirement for leak-tightness is satisfied by the bulkhead-to-bundle welds, which is state-of-the-art technology, and by fluid connection of the bulkhead-to-bulkhead system.

In specific embodiments, one of the bulkheads has a male side and the other a female side, with male or female formations that may, for example, have complementary tapers. Seals may be inserted in this connection at the interface. Additional proven technologies may be considered for the connections, such as 'pinbox' connectors or hydraulically-actuated connector hubs.

Embodiments of the invention provide a connection system for connecting two pipeline bundles mechanically and fluidly. Each pipeline bundle comprises, respectively, at least one pipeline designed for containing a fluid, said at least one pipeline being enclosed inside an external carrier pipe. Preferably there are two or more such pipelines inside the carrier pipe. The connection system comprises two interconnectable bulkhead hubs, wherein each hub is respectively welded to the carrier pipe of each bundle. Each hub comprises at least one fluid traversing bore welded respectively to at least one pipeline of each bundle.

A mechanical coupling system may be arranged to couple the hubs together. For example, the mechanical coupling may comprise a flange. The flange or other mechanical coupling may be enclosed in a protective cover.

Mutually-corresponding fluid traversing bores of the hubs are fluidly and leak-tightly connected when the hubs are mechanically coupled. Formations defining the fluid traversing bores may be tapered to seal together in a male-female arrangement.

The pipeline bundles suitably comprise at least one production pipeline or may comprise at least two pipelines and at least two fluid traversing bores. Either or both of the bulkhead hubs may comprise a pressure-test part.

Embodiments of the invention also provide a method to tie-in pipeline bundles each comprising a carrier pipe and at least one fluid transport line. That method comprises: fluid-tightly connecting a first bulkhead to an end of a first bundle and fluid-tightly connecting a second bulkhead to an end of a second bundle. Those bulkheads comprise complementary fluid traversing bores in fluid connection with the fluid transport lines of the respective bundles. When the first and second bulkheads are coupled together, the corresponding fluid traversing bores of the bulkheads are fluid-tightly connected during coupling of the bulkheads.

Optionally, the fluid-tight connection of the bundles to the bulkheads is effected by welding. Fluid tight connection of the bulkheads may involve the engagement of respective male and female formations that compress seals or gaskets.

In order that the invention may be more readily understood, reference will now be made, by way of example, to the accompanying drawings in which:

FIG. 5a is a perspective view of a pipeline bundle assembly in a variant of the invention;

FIG. 5b is an enlarged partially cut-away perspective view of the variant shown in FIG. 5a;

FIG. 6b is a side view, corresponding to FIG. 3a, of the variant of the interface shown in FIG. 6a.

Figure 1:
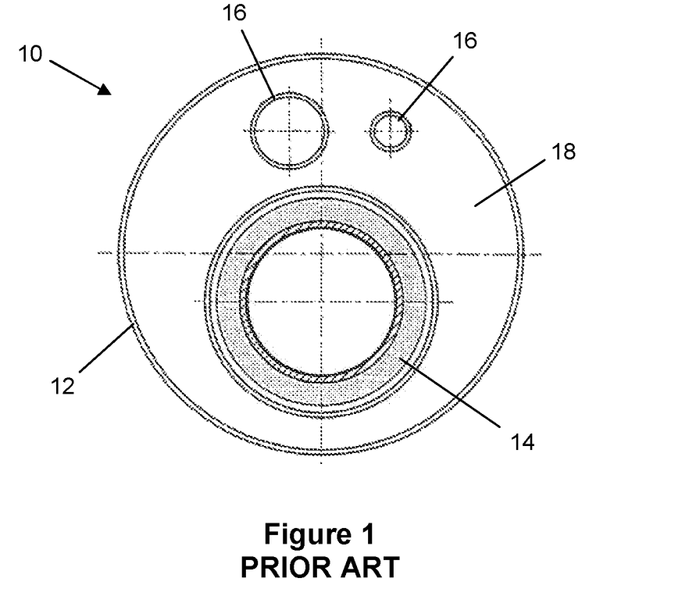
FIG. 1 is a cross-sectional view of a prior art pipeline bundle in which a carrier pipe surrounds other elongate elements of the bundle, exemplified here by flowlines or other fluid conduits.

Referring firstly to FIG. 1 of the drawings, a known pipeline bundle 10 comprises a rigid carrier pipe 12 of generally circular cross-section, usually made of steel. The carrier pipe 12 surrounds other elongate elements of the bundle 10 and has transverse bulkheads at its ends, not visible here, to define a sealed chamber around those elements.

In this simplified example, the other elongate elements within the carrier pipe 12 are a rigid flowline 14 and other fluid conduits 16, which are also usually made of steel. The flowline 14 and the other fluid conduits 16 are held spaced from each other and spaced from the inner circumference of the carrier pipe 12. The flowline 14 may be of single-wall or PiP construction. There may of course be other elongate elements within the carrier pipe 12, such as power cables or data cables, but they have been omitted from this simple example for clarity.

Spacers 18 span the internal diameter of the carrier pipe 12 to hold the flowlines 14, other fluid conduits 16 and any other elongate elements in appropriate positions within the carrier pipe 12.

A pipeline bundle portion or section 20 in accordance with the invention has a similar combination of main components as the bundle 10 shown in FIG. 1. In summary, those components are a rigid hollow carrier pipe 12 that is closed by bulkheads at its ends and surrounds one or more rigid flowlines 14 and other elongate elements, all preferably supported within the carrier pipe 12 by spacers 18. So, like numerals are used for like features in the description that follows.

Figure 2:
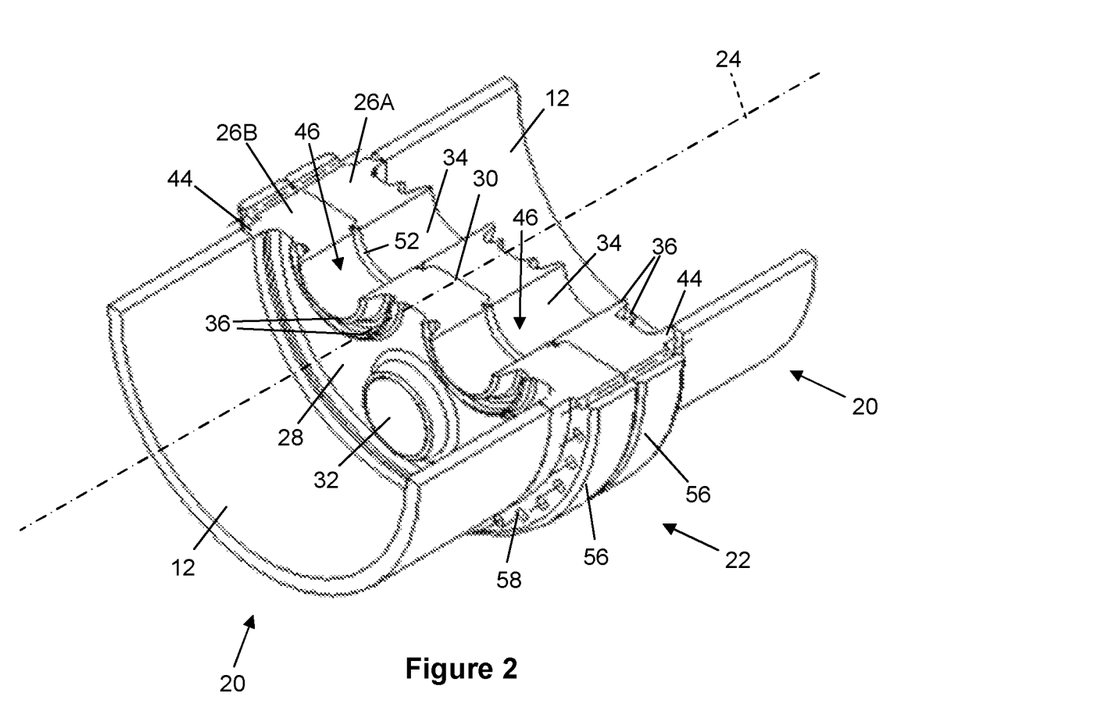
FIG. 2 is a perspective view of an interface between two bundle sections of the invention, which adjoin end-to-end to make a longer pipeline bundle assembly.
Figure 3A:
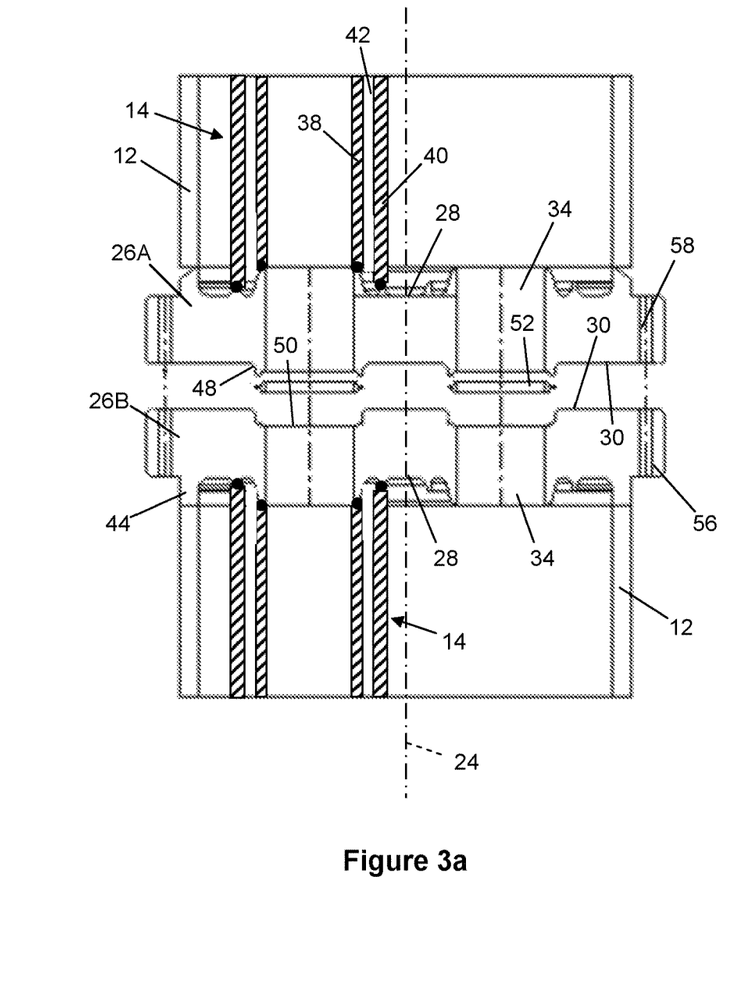
FIG. 3a is an exploded side view of the interface shown in FIG. 2 with the bundle sections being brought together.
Figure 3B:
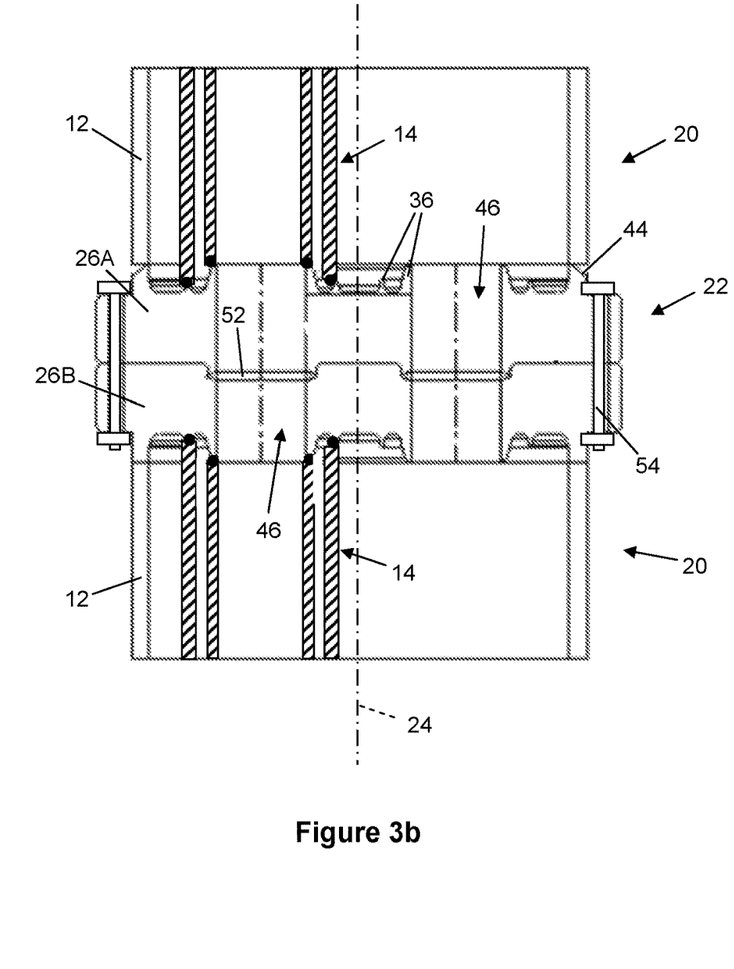
FIG. 3b is a side view of the interface corresponding to FIG. 3a but with the bundle sections now brought together.

FIGS. 2, 3a and 3b show an interface or junction between two bundle sections 20 of the invention, which adjoin end-to-end to make a longer pipeline bundle assembly 22. The bundle assembly 22 may comprise two, three or more of such bundle sections 20 in mutual alignment along a common central longitudinal axis 24.

It will be apparent from FIGS. 2, 3a and 3b that the carrier pipes 12 of the bundle sections 20 are closed by respective transverse bulkheads 26A, 26B located at the adjoining ends of the carrier pipes 12. Where the carrier pipes 12 are of steel, the bulkheads 26A, 26B may be machined steel forgings welded to the respective ends of the carrier pipes 12. This defines a sealed chamber within each carrier pipe 12. Optionally, those chambers may be pressurised or charged to an elevated pressure to counteract hydrostatic pressure at the water depth anticipated during installation. In some applications, it is also possible for those chambers to be flooded in a controlled manner for buoyancy control or to settle the bundle onto the seabed.

Thus, the bulkheads 26A, 26B of the adjoining bundle sections 20 face each other across the interface. In accordance with the invention, the bulkheads 26A, 26B are adapted to transmit forces between the adjoining bundle sections 20 and to provide for leak-tight fluid communication between the adjoining bundle sections 20.

In this example, the bundle assembly 22 is arranged to contain three or more parallel fluid conduits such as flowlines 14. Those flowlines 14 have been omitted entirely from FIG. 2 for clarity but one of them is shown schematically in FIGS. 3a and 3b for ease of understanding. That flowline 14 is shown in FIGS. 3a and 3b as being of PiP construction, although it could be of single-wall construction instead. The flowlines 14 are also of steel in this example.

Each bulkhead 26A, 26B extends in a plane orthogonal to the central longitudinal axis 24 of the respective bundle section 20. The bulkheads 26A, 26B each have a proximal or inner face 28 that faces axially inwardly toward the inside of the associated carrier pipe 12 and a distal or outer face 30 that faces axially outwardly away from the associated carrier pipe 12.

The inner face 28 of each bulkhead 26A, 26B is welded around its periphery to an end of the associated carrier pipe 12. Conversely, the outer face 30 of each bulkhead 26A, 26B faces toward the complementary outer face 30 of the bulkhead 26A, 26B of the adjoining bundle section 20, across the mutual interface when the bundle sections 20 are brought together.

In this example, the outer face 30 of each bulkhead 26A, 26B defines a substantially flat seating surface extending across substantially all of the diameter of the bulkhead 26A, 26B. That seating surface is arranged to abut, bear against or mate with the corresponding seating surface of the other, opposed bulkhead 26A, 26B.

The bulkheads 26A, 26B are penetrated by an array of openings 32 whose positions correspond to the angular and radial positions of the flowlines 14 within the carrier pipe 12 about the central longitudinal axis 24. As is conventional, the positions of the flowlines 14 may be determined by spacers that are displaced longitudinally within the carrier pipes 12 and so are not visible in these drawings.

It will be apparent that in addition to sealing the ends of the bundle sections 20, the bulkheads 26A, 26B serve, in effect, as spacers at an intermediate point along the length of the bundle assembly 22. This reduces the total number of spacers required to make the bundle assembly 22.

The openings 32 in the bulkheads 26A, 26B are defined by respective tube formations 34 that extend parallel to the central longitudinal axis 24. The tube formations 34 are integral with the bulkheads 26A, 26B in this example but could instead be separate tubular sleeves fixed to the bulkheads 26A, 26B.

The flowlines 14 are fixed to the inner faces 28 of the bulkheads 26A, 26B around the peripheries of the respective openings 32 in a leak-tight manner, preferably by welding as in this example, such that the openings 32 are in fluid communication with the interior of the flowlines 14.

Specifically, concentric circular flanges 36 on the inner face 28 of each bulkhead 26A, 26B are welded respectively to inner and outer pipes 38, 40 of each PiP flowline 14. In this way, the bulkhead 26A, 26B closes and seals the annulus 42 between the inner and outer walls 38, 40 of the flowline 14. The radially innermost of those flanges 36 is defined by an end of a tube formation 34 that protrudes proximally from the inner face 28 of the bulkhead 26A, 26B.

Similarly, a peripheral outer flange 44 encircles the inner face 28 of each bulkhead 26A, 26B to be welded to an end of the associated carrier pipe 12.

When the bundle sections 20 are brought together end-to-end as shown, the openings 32 of each bulkhead 26A, 26B align with their counterparts in the opposing, facing bulkhead 26A, 26B. Hence, when the correctly-aligned bulkheads 26A, 26B are moved together in an axial or longitudinal direction parallel to the central longitudinal axis 24, the tube formations 34 defining the opposed openings 32 cooperate and seal together around their adjoining periphery. The cooperating openings 32 together form respective longitudinal passages 46 that extend parallel to the central longitudinal axis 24. These passages 46 assure leak-proof fluid communication along the bundle assembly 22 from the flowlines 14 of one bundle section 20 through the openings 32 to the flowlines 14 of the next bundle section 20.

It will be apparent from FIGS. 2, 3a and 3b that the facing bulkheads 26A, 26B are not identical to each other. Instead, their outer faces 30 are shaped to complement each other so as to fit together, engage and interlock when the bundle sections 20 are brought together end-to-end on their shared central longitudinal axis 24. Thus, fluid coupling formations on the outer faces 30 of the bulkheads 26A, 26B surround the openings 32. The flat seating surface of each outer face 30 extends laterally between those formations.

Specifically, bulkhead 26A has male formations on its outer face 30 that are received in complementary female formations on the outer face 30 of bulkhead 26B upon convergent axial or longitudinal movement between the bulkheads 26A, 26B. The male and female formations may be regarded as inverse mirror images of each other about the transverse interface plane that lies between the abutting outer faces 30.

In this example, the male formations are defined by hollow tubular spigots 48 that protrude distally from the outer face 30 of bulkhead 26A. Optionally, each spigot 48 tapers distally as shown. Each spigot 48 is at a distal end of a tube formation 34 surrounding one of the openings 32 in bulkhead 26A.

Conversely, the female formations are defined by circular sockets or recesses 50 in the outer face 30 of bulkhead 26B, each surrounding one of the openings 32 in bulkhead 26B. The recesses 50 complement the shapes of the spigots 48.

Each spigot 48 is received in a respective one of the recesses 50 when the bulkheads 26A, 26B are coupled together. Thus, each pair of opposed flowlines 14 are connected simultaneously as the two bulkheads 26A, 26B are brought together;

As best appreciated in the exploded view of FIG. 3a, each recess 50 provides a seat for a resilient annular gasket or seal 52. The seal 52 may be shaped as a flattened plate, as shown, or as an O-ring. The seal 52 acts in compression between the base of the recess 50 and a cooperating spigot 48 engaged in the recess 50, to maintain leak-tightness in a passage 46 defined between the respective openings 32 in the coupled bulkheads 26A, 26B. It will be noted that the recess 50 is wider than the associated opening 32, and hence wider than the passage 46, to define a shoulder on which the seal 52 is seated.

To exert sealing pressure on the seals 52, the bulkheads 26A, 26B are pressed together mechanically and held together in a state of mutual axial compression. In this example, the outer faces 30 of the bulkheads 26A, 26B are clamped together by a ring of bolts 54, as shown in FIG. 3b, that encircle the bundle assembly 22 and extend parallel to the central longitudinal axis 24.

The bolts 54 act in axial tension on parallel circumferential flanges 56 that protrude radially from the respective bulkheads 26A, 26B. Each flange 56 is penetrated by a circumferential array of axial holes 58 that accommodate the bolts 54. Preload exerted by the bolts 54 on the bulkheads 26A, 26B via the flanges 56 forces the spigots 48 into the recesses 50 and compresses the seals 52 to ensure a pressure-containing leak-tight connection through the passages 46 between each pair of opposed flowlines 14.

Figure 4:
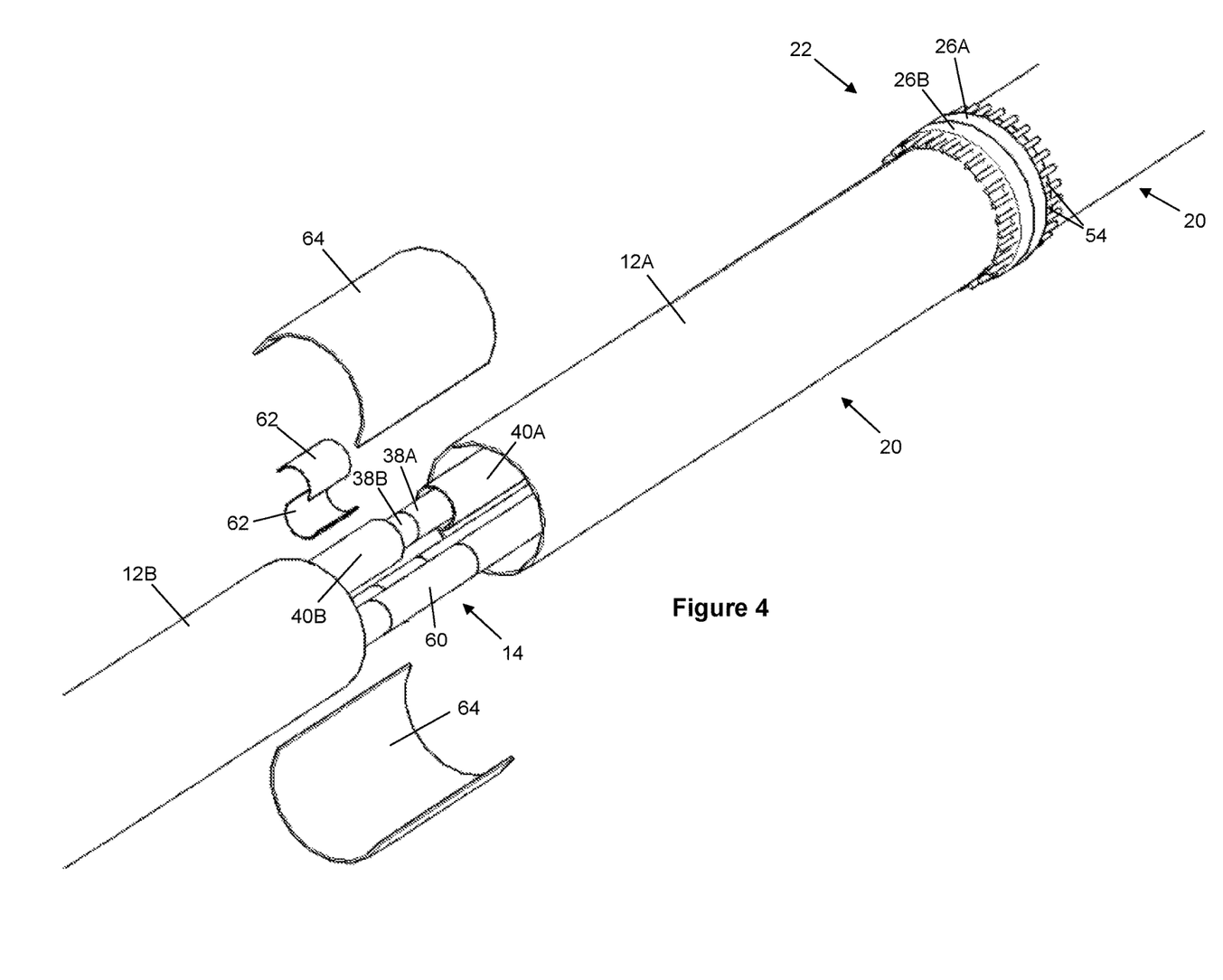
FIG. 4 is a partially cut-away and exploded perspective view of a pipeline bundle assembly of the invention, showing the optional use of flowline transition pieces around the interface.

Turning next to FIG. 4 of the drawings, this shows that, after they are machined, the bulkheads 26A, 26B may be welded to transition pieces that are welded in turn to the remainder of the respective bundle sections 20. This helps to manage correct alignment of the bulkheads 26A, 26B with the respective bundle sections 20 and, when clamped together, with each other.

The machined bulkheads 26A, 26B are first welded onto flowline transition pieces or 'stick-outs'. For PIP flowlines 14 as shown in this example, the flowline transition pieces comprise inner and outer pipes 38A, 40A that are welded in turn to the inner faces 28 of the respective bulkheads 26A, 26B.

Next, a carrier pipe transition piece 12A is welded to the inner face 28 of the bulkhead 26A, 26B around the inner and outer pipes 38A, 40A that define the flowline transition pieces. The carrier pipe transition piece 12A may have a thicker wall than the main body 12B of the carrier pipe to account for increased bending and axial stresses to be expected near the interface between the bundle sections 20.

FIG. 4 shows that the carrier pipe transition piece 12A is slightly shorter than the outer pipe 40A of the flowline transition pieces. In turn, the outer pipe 40A is slightly shorter than the inner pipe 38A of the flowline transition pieces. Thus, the inner pipe 38A protrudes slightly beyond the end of the outer pipe 40A. Similarly, the outer pipe 40A protrudes slightly beyond the end of the carrier pipe transition piece 12A.

The two assemblies of the bulkheads 26A, 26B with the respective transition pieces 12A, 38A, 40A may then be brought together for the bolt holes 58 in the flanges 56 of the bulkheads 26A, 26B to be match-drilled. An alternative to match-drilling is to provide a swivel on one flange 56 complete with shear keys where required. The assemblies of the bulkheads 26A, 26B with the respective transition pieces 12A, 38A, 40A are then separated from each other to be incorporated into respective bundle sections 20.

The separate assemblies of the bulkheads 26A, 26B with the respective transition pieces 12A, 38A, 40A are welded via the transition pieces 12A, 38A, 40A to counterpart pipes 12B, 38B, 40B in a prefabricated body portion of a bundle section 20. Measures are taken to account for any differences in length and to ensure correct alignment. For example, pup pieces 60 may join sections of a flowline 14.

The inner pipes 38A are welded end-to-end to inner pipes 38B, either directly or via a pup piece. Half-shells 62 are welded together around the inner pipes 38A, 38B and welded to the opposed ends of the outer pipes 40A to complete each PiP flowline 14.

Finally, outer half-shells 64 are welded together around the flowlines 14 and welded to the opposed ends of the carrier pipes 12A, 12B to complete the bundle section 20.

This procedure keeps the outer face 30 of a bulkhead 26A, 26B in the correct plane and position relative to the remainder of the bundle section 20. All of these welding operations, and subsequent weld testing operations, take place off the critical path and so do not delay the fabrication process for manufacturing the bundle assembly 22.

The bundle sections 20 are now ready to be brought together and fixed together to make a bundle assembly 22 as described above with reference to FIGS. 2, 3a and 3b. The bulkheads 26A, 26B are preferably supported when being brought together for match-drilling or for final assembly by a frame or tool. That frame or tool suitably provides for controlled movement of the bulkheads 26A, 26B to adjust their relative positions with six degrees of freedom.

Figures 5A, 5B:
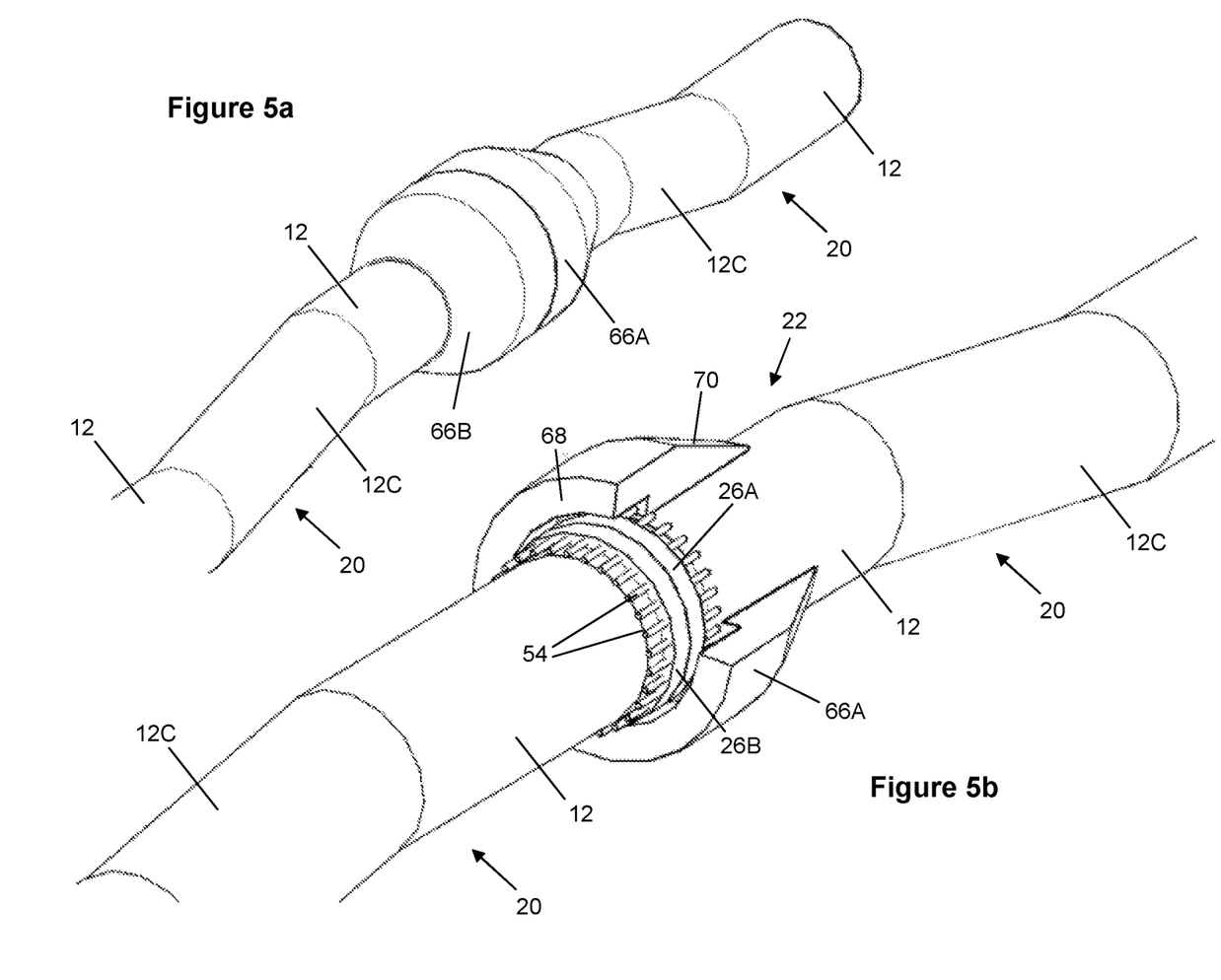

Moving next to FIGS. 5a and 5b, these show optional shrouds 66A, 66B for protecting the bulkheads 26A, 26B. The protection of the shrouds 66A, 66B may be beneficial during transit and fabrication, including when joining an assembly of a bulkhead 26A, 26B with its associated transition pieces to the prefabricated body portion of a bundle section 20. The shrouds 66A, 66B may be used individually on respective bulkheads 26A, 26B for this purpose.

It may also be beneficial to fit the shrouds 66A, 66B over the adjoining bulkheads 26A, 26B upon completion of the bundle assembly 22. The shrouds 66A, 66B can then cooperate with each other to surround and protect the flanges 56 of the bulkheads 26A, 26B and the connecting bolts 54, particularly as the bundle assembly 22 is launched from a fabrication facility and towed across a shore and out to sea. The shrouds 66A, 66B may continue to protect the bulkheads 26A, 26B during and after installation of the bundle assembly 22, including when the bundle assembly 22 is in use following its installation on the seabed.

The shrouds 66A, 66B have adjoining planar faces 68 to abut each other when used in combination. The shrouds 66A, 66B also have oppositely-inclined frusto-conical ramp surfaces 70. When the shrouds 66A, 66B are brought into abutting relationship about their faces 68, the ramp surfaces 70 allow the shrouds 66A, 66B to present a smooth, snag-resistant convex outer surface.

To avoid snagging when the bundle assembly 22 is launched axially down a launch way and into the sea, launch way bogies may be positioned under the bundle assembly 22 to both sides of the adjoining bulkheads 26A, 26B to keep the bulkheads 26A, 26B clear of the launch way during launch. An alternative or additional way of protecting the bulkheads 26A, 26B during launch and in use is to raise an interface portion of the bundle assembly 22 around the bulkheads 26A, 26B above the level of the rest of the bundle assembly 22. This is achieved in FIGS. 5a and 5b by concentric cones or upwardly-angled pipe sections 12C on either side of the interface defined by the bulkheads 26A, 26B.

Following connection and bolting-up of the bulkheads 26A, 26B, leak testing is best performed onshore either before or during launch of the bundle assembly 22. A back seal test is preferred to facilitate leak testing in a time-effective manner, bearing in mind the potential impact on the critical path.

Figure 6A:
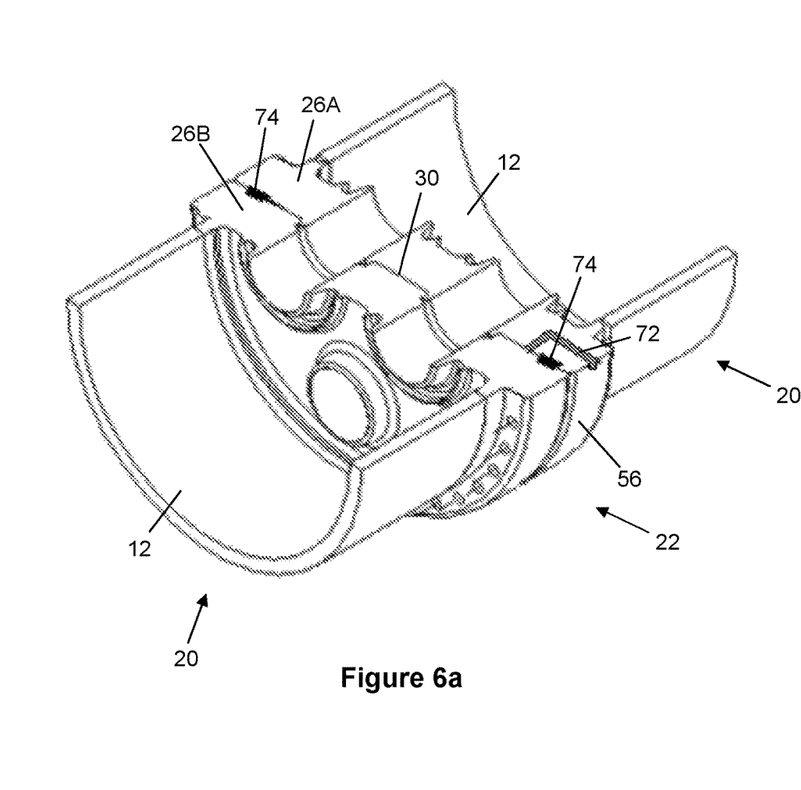
FIG. 6a is a perspective view, corresponding to FIG. 2, of a variant of the interface shown in FIGS. 2, 3a and 3b.
Figure 6B:
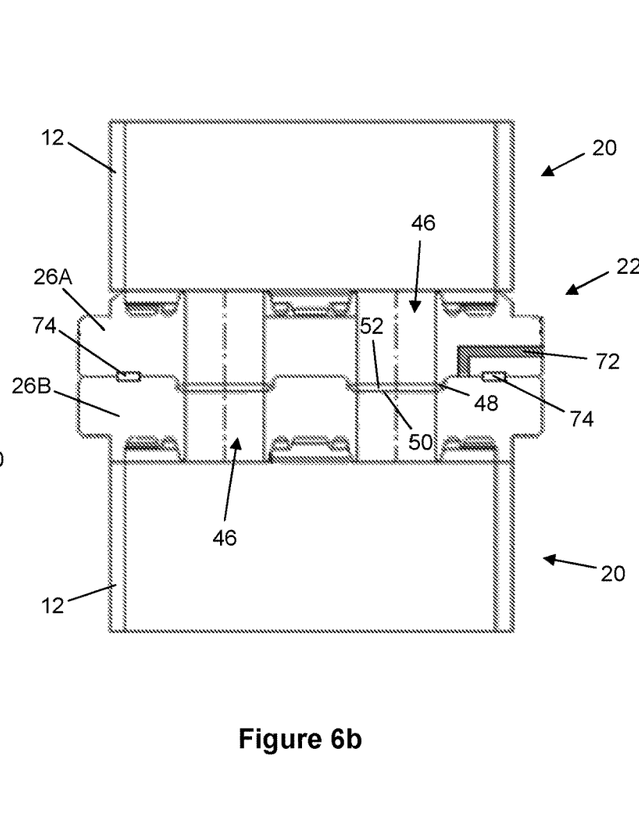

For this purpose, FIG. 6 shows one of the bulkheads, in this example bulkhead 26A, with a port 72 that is machined into the side wall of its flange 56 and that communicates with the outer face 30 of the bulkhead 26A. A circumferential compression seal 74 encircles the outer face 30 of the bulkhead 26A outboard of the port 72, and is held under compression by, and sealing engagement with, the outer face 30 of the other bulkhead 26B.

This arrangement of the port 72 and the circumferential seal 74 enables a back seal test to be performed by introducing high-pressure fluid into the cavity defined within the circumferential seal 74. That cavity contains all of the seals 52 between the cooperating spigots 48 and recesses 50 of the opposed bulkheads 26A, 26B. Thus, a seal test performed in this manner can be used to confirm quickly, in a single operation, that all of the flowlines 14 have been sealed effectively to the associated passageways 46 extending through the conjoined bulkheads 26A, 26B.

Figure 7:
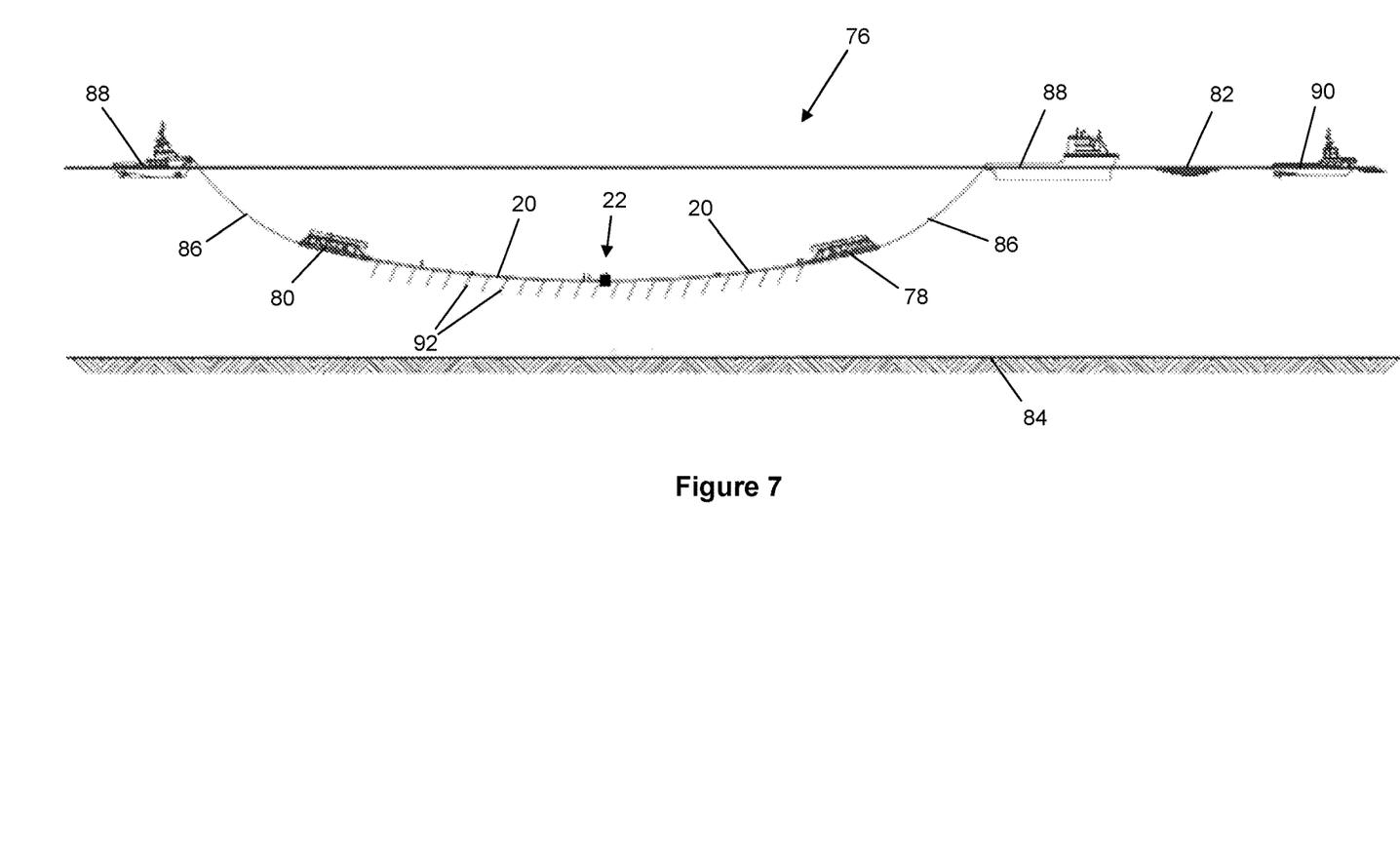
FIG. 7 is a side view of a pipeline bundle assembly of the invention being towed in mid-water as part of a towable unit that comprises towheads at opposed ends of the bundle.

Finally, FIG. 7 shows a towable unit 76 comprising the pipeline bundle assembly 22 connecting a leading towhead 78 and a trailing towhead 80. The bundle assembly 22 is shown in FIG. 7 both interrupted and greatly shortened: in practice, the bundle assembly 22 will extend over a considerable distance between the towheads 78, 80—typically about 2 km.

The towheads 78, 80 incorporate buoyancy, or provide for buoyancy to be attached, to offset their weight during towing. For example, buoyancy may be added directly to the towheads 78, 80 by attaching buoys or buoyancy modules to them.

The pipeline bundle assembly 22 also contributes buoyancy to the unit 76 by virtue of air or other gas contained within the sealed carrier pipes 12 of the respective bundle sections 20. Additional external buoyancy may also be provided on, or attached to, the carrier pipes 12.

The unit 76 is apt to be fabricated and tested onshore or in sheltered water before being towed to an installation site. If fabricated onshore, the whole unit 76 may then be pulled into the sea. This is already done for pipe bundles that form hybrid riser towers used in the subsea oil and gas industry.

Various towing methods may be used to transport the unit 76 to an offshore installation site. In particular, the unit 76 may be towed at various depths in water. The choice of towing depth involves a trade-off between various factors.

For example, the unit 76 may be surface-towed at or near to the surface 82, which is easiest to manage. However, surface water dynamics generate fatigue in the pipeline bundle assembly 22, which is the limiting factor that determines the allowable tow distance. Conversely, towing near the seabed 84 protects the bundle assembly 22 from the influence of surface water dynamics and limits risks during subsequent lowering to the seabed 84 at the installation site. However, controlling the unit 76 is more challenging at depth and is only feasible if the contours of the seabed 84 permit.

FIG. 7 shows the alternative of a mid-water towing method in which the unit 76 is towed at an intermediate depth in the water column between the surface 82 and the seabed 84. Here, the unit 76 is safely clear of the contours of the seabed 84 and is beneath significant influence from wave action near the surface 82. Specifically, FIG. 7 shows a favoured mid-water towing method known in the art as the 'controlled-depth tow method' or CDTM, as described in U.S. Pat. No. 4,363,566.

Mid-water towing is a good compromise that ensures low-stress installation without the use of large crane vessels that depend on low sea states. This makes installation less weather-sensitive and reduces the cost of installation vessels significantly. However, mid-water towing requires precise buoyancy management.

In all towing methods, the unit 76 is held in tension by lines or tethers 86 extending fore and aft from the respective towheads 78, 80 to respective installation vessels such as tugs 88. The bundle assembly 22 acts in tension between the towheads 78, 80 during towing, with tensile loads being borne principally by the successive carrier pipes 12 of the bundle sections 20 that make up the bundle assembly 22.

The speeds of, and spacing between, the tugs 88 is adjusted to maintain the required depth having regard to the effect of drag forces and tension in the tethers 86. Optionally, a third patrol/survey vessel 90 ahead of the leading tug 88 surveys the route and monitors the towing operation.

In CDTM, the pipeline bundle assembly 22 is made neutrally buoyant at the required depth by the addition of buoyancy and/or ballast chains spaced along its length. In the example shown, ballast chains 92 spaced along the bundle assembly 22 add weight that offsets the buoyancy of the bundle assembly 22. The ballast chains 92 may, for example, be attached to the bundle assembly 22 using cargo straps. As a result of the added ballast weight, the bundle assembly 22 hangs between the towheads 78, 80 as a catenary.

When the unit 76 reaches an installation site, the unit 76 is lowered toward the seabed 84 while the tethers 86 are paid out from the tugs 88. The unit 76 can be lowered to the seabed 84 by removing external buoyancy from the unit 76 or by adding ballast to the unit 76.

The unit 76 settles on the seabed 84 in a predetermined gap in the subsea production system. For example, an upstream one of the towheads 78, 80 may be interposed between a wellhead and the bundle assembly 22 and a downstream one of the towheads 78, 80 may be interposed between the bundle assembly 22 and a riser.

When on the seabed 84 at the installation site, the unit 76 is connected via spool or jumper pipes at each towhead 78, 80 to other elements of the subsea production system using suitable well-known connectors. Those other elements may be placed on the seabed 84 before or after the unit 76. Spool or jumper pipes may connect the upstream one of the towheads 78, 80 to the wellhead and the downstream one of the towheads 78, 80 to the riser. However, the towheads 78, 80 could be connected to the wider subsea production system in other ways, for example via manifolds, and so need not be connected directly to the wellhead or to the riser.

FIG. 7 highlights key advantages of the invention. One of those advantages is to mitigate the requirement for multiple separate tows of multiple-bundle tie-back systems by connecting adjoining ends of bundle sections via specially-adapted bulkheads.

Thus, the invention allows one or more tows to be removed from an offshore campaign where more than one bundle section 20 is required to make a bundle assembly 22 of the required length. Also, only two towheads 78, 80 are needed to tow and install a bundle assembly 22 comprising multiple bundle sections 20.

Another benefit of the invention is the ability of the bulkhead connection system to pretension pipelines before welding. This reduces fatigue generated by cycles of thermal expansion.

Yet another benefit of the invention is that the bulkheads 26A, 26B create a highly-effective waterstop that will prevent the entire bundle assembly 22 flooding uncontrollably in the event that the carrier pipe 12 of any one of the bundle sections 20 is ever breached.

Where a bundle assembly 22 consists of just two bundle sections 20 of the invention, it follows that each of those bundle sections 20 will define a respective end of the bundle assembly 22. In that case, each bundle section 20 suitably has a conventional bulkhead at one end, corresponding to a respective end of the bundle assembly, and a bulkhead 26A, 26B of the invention at the other end, corresponding to an intermediate junction or interface at a mid-point of the bundle assembly 22. Typically, each conventional bulkhead is arranged to be welded to a respective towhead.

Where a bundle assembly 22 consists of more than two bundle sections 20 of the invention, two of those bundle sections 20 will define respective ends of the bundle assembly 22 and there will be one or more intermediate or central bundle sections between them. Those end bundle sections 20 may have a conventional bulkhead at one end to be welded to respective towheads and a bulkhead 26A, 26B of the invention at the other end. Conversely, the or each intermediate or central bundle section 20 will have bulkheads 26A, 26B of the invention at both ends, these corresponding to two or more intermediate junctions or interfaces spaced along the length of the bundle assembly 22.

Other variations are possible within the inventive concept. For example, the carrier pipe and/or the flowlines may be of a composite material. One example of such as a composite material contains reinforcing fibres in a polymer matrix of PEEK (polyether ether ketone). Where a pipe is of composite material, steel end-fittings may be adapted to secure the pipe to bulkheads by welding or by other leak-proof fixing methods.

The pipeline bundle assembly may be towed using techniques other than CDTM, for example being shaped as an inverted catenary during towing. This may be achieved by adding ballast weight to the towheads to act against central buoyant upthrust on the bundle assembly that extends between the towheads.

It is not essential that the bulkheads have male formations and complementary female formations on their outer faces. Nor is it essential that male formations are confined to only one bulkhead and that female formations are confined to only the other bulkhead. It would be possible instead for a bulkhead to have a combination of both male formations and female formations on its outer face.

In view of the considerable width of the bulkheads transverse to the central longitudinal axis, the clamping force and consequent sealing pressure may not be linear across the full diameter of the bulkhead-to-bulkhead connection. In that event, sealing may be assured by one or more of the following measures, namely: by shaping the sealing surfaces on the outer faces of the bulkheads with a slightly convex profile; by providing convex sealing plates as the annular seals; or by sizing the bolts and hence determining the sealing force to account for decay in sealing pressure while ensuring adequate sealing pressure in centrally-located flowlines within the bundle assembly.

Instead of bolted flanges, mechanical coupling may be implemented in other ways. One example of an alternative mechanical coupling is a 'pinbox' or 'pin-and-box' connector, as offered by Oil States Industries, Inc. and GMC Limited under the trade marks 'Merlin' and 'GMC Mechanical Connector'. Conveniently, structures implementing such connectors may also implement the bulkheads.

Pin-and-box connectors comprise an outer female sleeve, or 'box', at an end of one bundle section, around an inner tubular male part, or 'pin', at an adjoining end of another bundle section. The box has an internal annular array of teeth that are engageable with complementary external teeth on the pin.

On assembly, hydraulic pressure applied in the annular interface between the pin and the box deforms the pin and the box elastically to keep the arrays of teeth out of engagement as the box is driven axially around the pin to force the bundle sections together. When the hydraulic pressure is relaxed, elastic recovery moves the teeth of the pin radially outwardly and the teeth of the box radially inwardly into mutual engagement, locking the bundle sections together.

The invention claimed is:

1. A bundle section of a pipeline bundle for subsea installation comprises:
   a rigid elongate carrier pipe having at least one end closed by a transverse bulkhead, the bulkhead having an inner face that faces inwardly toward an interior of the carrier pipe in a direction parallel to a central longitudinal axis of the carrier pipe, and the outer face that is opposed to the inner face and that faces outwardly away from the interior of the carrier pipe; and
   two or more elongate elements extending along and within the carrier pipe to the inner face of the bulkhead, those elements comprising at least one fluid conduit in fluid communication with a respective opening that extends from the inner face of the bulkhead to the outer face of the bulkhead so as to penetrate the bulkhead;
   wherein the outer face of the bulkhead has integral outwardly-facing fluid coupling formations surrounding the or each opening, those formations being arranged to effect leak-tight coupling when forced longitudinally against opposed complementary fluid coupling formations; and
   the or each fluid conduit is welded to the inner face of the bulkhead around the respective opening for leak-tight fluid communication with that opening.

2. The bundle section of claim 1, wherein the fluid coupling formations are fixed relative to the bulkhead.

3. The bundle section of claim 1, wherein the fluid coupling formations comprise at least one male formation projecting from the outer face of the bulkhead.

4. The bundle section of claim 3, wherein a male formation comprises a hollow spigot protruding from the outer face.

5. The bundle section of claim 4, wherein the spigot tapers outwardly from the outer face.

6. The bundle section of claim 1, wherein the fluid coupling formations comprise at least one female formation recessed into the outer face of the bulkhead.

7. The bundle section of claim 6, wherein a female formation is a recess that is wider than the opening surrounded by the recess.

8. The bundle section of claim 7, comprising a sealing shoulder surface within the recess around the opening.

9. The bundle section of claim 7, wherein the recess tapers inwardly from the outer face.

10. The bundle section of claim 6, wherein the female formation contains an annular seal.

11. The bundle section of claim 1, wherein the outer face of the bulkhead defines a substantially planar seating surface between and around the fluid coupling formations.

12. The bundle section of claim 1, wherein the outer face of the bulkhead defines a convex seating surface between and around the fluid coupling formations.

13. The bundle section of claim 1, wherein the fluid coupling formations are machined.

14. The bundle section of claim 1, wherein the outer face of the bulkhead is machined across substantially its full diameter.

15. The bundle section of claim 1, wherein the carrier pipe is welded to an inner face of the bulkhead around the elongate elements within the carrier pipe.

16. The bundle section of claim 1, wherein the bulkhead further comprises at least one mechanical coupling formation for applying longitudinal force to the bulkhead.

17. The bundle section of claim 16, wherein the mechanical coupling formation projects radially from the bulkhead beyond an outer diameter of the carrier pipe.

18. The bundle section of claim 17, wherein the mechanical coupling formation is a flange extending around the bulkhead.

19. The bundle section of claim 16, wherein the mechanical coupling formation comprises male or female arrays of longitudinally-spaced teeth.

20. The bundle section of claim 1, wherein the carrier pipe comprises a minor end portion joined to the bulkhead and a major body portion joined to the end portion by one or more intermediate pieces.

21. The bundle section of claim 20, wherein the end portion of the carrier pipe has a thicker wall than the body portion of the carrier pipe.

22. The bundle section of claim 20, wherein the or each fluid conduit comprises a minor end portion joined to the bulkhead and a major body portion joined to the end portion directly or via one or more intermediate pieces, the minor end portion of the fluid conduit being longer than the minor end portion of the carrier pipe.

23. In combination, at least two bundle sections of claim 1 connected end-to-end with their bulkheads in mutually-opposed, face-to-face relation and the fluid coupling formations of one of those bulkheads being coupled with opposed complementary fluid coupling formations of the other of those bulkheads.

24. A pipeline bundle comprising two or more bundle sections connected end-to-end, the bundle sections each comprising:
   a rigid elongate carrier pipe having at least one end closed by a transverse bulkhead, the bulkhead having an inner face that faces inwardly toward an interior of the carrier pipe in a direction parallel to a central longitudinal axis of the carrier pipe, and an outer face that is opposed to the inner face and that faces outwardly away from the interior of the carrier pipe; and
   two or more elongate elements extending along and within the carrier pipe to the inner face of the bulkhead, those elements comprising at least one fluid conduit in fluid communication with a respective opening that extends from the inner face of the bulkhead to the outer face of the bulkhead so as to penetrates the bulkhead;
   wherein the or each fluid conduit is welded to the inner face of the bulkhead around the respective opening for leak-tight fluid communication with that opening;
   wherein the bulkheads of adjoining bundle sections are in mutually-opposed, face-to-face relation; and
   the outer face of each of those bulkheads has integral outwardly-facing fluid coupling formations surrounding the or each opening, the fluid coupling formations of one of those bulkheads being coupled with opposed complementary fluid coupling formations of the other of those bulkheads.

25. The pipeline bundle of claim 24, wherein there is abutting contact between seating surfaces on the outer faces of the bulkheads between and around the fluid coupling formations.

26. The pipeline bundle of claim 24, wherein the bulkheads are pressed together.

27. The pipeline bundle of claim 26, further comprising a mechanical locking mechanism acting on the bulkheads.

28. The pipeline bundle of claim 27, wherein the mechanical locking mechanism comprises one or more tensile elements acting in tension between the bulkheads.

29. The pipeline bundle of claim 27, wherein the mechanical locking mechanism applies convergent longitudinal pressure to the bulkheads.

30. The pipeline bundle of claim 24, wherein at least one of the bulkheads includes a pressure-testing port communicating with a sealed cavity surrounding the fluid coupling formations of the bulkheads.

31. The pipeline bundle of claim 24, further comprising a shroud enclosing the bulkheads.

32. The pipeline bundle of claim 31, wherein the shroud comprises first and second abutting parts, each surrounding a respective one of the bulkheads.

33. A method of assembling a subsea pipeline bundle from bundle sections, each bundle section comprising a rigid elongate carrier pipe containing two or more elongate elements, at least one of which is a fluid conduit, extending along and within the carrier pipe to a bulkhead fixed to an end of the carrier pipe, the bulkhead having an inner face that faces inwardly toward an interior of the carrier pipe in a direction parallel to a central longitudinal axis of the carrier pipe, and an outer face that is opposed to the inner face and that faces outwardly away from the interior of the carrier pipe, wherein the or each fluid conduit is welded to the inner face of the bulkhead around a respective opening that extends from the inner face of the bulkhead to the outer face of the bulkhead so as to penetrates the bulkhead for leak-tight fluid communication with that opening, and wherein the method comprises:

bringing the bulkheads of the bundle sections into mutually-opposed, face-to-face relation; and applying force longitudinally to effect leak-tight coupling between mutually-opposed complementary fluid coupling formations on the bulkheads, those formations being integral with the bulkhead and surrounding respective openings in the bulkheads that communicate with the respective fluid conduits.

34. The method of claim 33, comprising applying longitudinal force to the coupling formations via the bulkheads.

35. The method of claim 33, comprising bringing the bulkheads into mutually-abutting contact between and around the fluid coupling formations.

36. The method of claim 33, comprising interlocking the bulkheads to locate the bulkheads against lateral or angular movement relative to each other.

37. The method of claim 33, comprising engaging male and female fluid coupling formations by relative longitudinal movement between the bulkheads.

38. The method of claim 33, comprising locking together the bulkheads against separation.

39. The method of claim 33, comprising leak-testing by applying fluid pressure within a sealed cavity surrounding the fluid coupling formations of the bulkheads.

* * * * *